US005159807A

United States Patent [19]

Forestier

[11] Patent Number: 5,159,807

[45] Date of Patent: Nov. 3, 1992

[54] CONTROL SYSTEM FOR OXIDIZER INTAKE DIAPHRAGMS

[75] Inventor: Alexandre Forestier, Melun, France

[73] Assignee: Societe Nationale d'Etude et de Construction de Motors d'Aviation "S.N.E.C.M.A.", Paris, France

[21] Appl. No.: 694,256

[22] Filed: May 1, 1991

[30] Foreign Application Priority Data

May 3, 1990 [FR] France ............................... 90 05556

[51] Int. Cl.[5] ............................................... F02C 9/16

[52] U.S. Cl. ................................... 60/39.23; 60/39.37

[58] Field of Search ................. 60/39.23, 39.29, 39.36, 60/39.37

[56] References Cited

U.S. PATENT DOCUMENTS

| | | | |
|---|---|---|---|
| 3,765,171 | 10/1973 | Hagen et al. | 60/39.23 |
| 3,869,246 | 3/1975 | Hammond, Jr. et al. | |
| 3,902,316 | 9/1975 | Huellmantel . | |
| 3,941,313 | 3/1976 | Jumelle . | |
| 4,409,791 | 10/1983 | Jourdain et al. . | |
| 4,534,166 | 8/1985 | Kelm et al. | 60/39.23 |
| 4,677,822 | 7/1987 | Iizuka et al. | 60/39.23 |
| 4,726,182 | 2/1988 | Barbier et al. | 60/39.23 |
| 4,754,600 | 7/1988 | Barbier et al. | 60/39.23 |
| 4,766,722 | 8/1988 | Bayle-Laboure et al. | 60/39.23 |

*Primary Examiner*—Louis J. Casaregola
*Attorney, Agent, or Firm*—Bacon & Thomas

[57] ABSTRACT

A system for controlling oxidizer intake diaphragms for a gas turbine engine combustion chamber is disclosed having a single, linear actuator for each pair of intake diaphragms. The movable member of each of an adjacent pair of intake diaphragms is connected to a movable piston rod of the linear actuator. A cam mechanism urges the piston rod in a first direction so as to simultaneously move the movable members of each of the pair of diaphragms. Pressurized gases from the combustion chamber act on the piston to urge it in a second, opposite direction. The forces of the pressurized gases also maintain contact between the cam member and the piston to insure accurate movement of the movable members. A plurality of such linear actuators may be disposed around the periphery of the combustion chamber, each actuator controlling a pair of adjacent intake diaphragms. The actuators may be interconnected by a flexible drive shaft to insure uniformity of movement of all of the cam elements in the system. This insures accurate and simultaneous control of all the intake diaphragms.

18 Claims, 3 Drawing Sheets

CONTROL SYSTEM FOR OXIDIZER INTAKE DIAPHRAGMS

BACKGROUND OF THE INVENTION

The present invention relates to a system for controlling oxidizer intake diaphragms for the combustion chamber of a gas turbine engine.

Intake diaphragms for controlling the flow of an oxidizer, such as air into the combustion chamber of a gas turbine engine are well-known in the art. A typical example is shown in U.S. Pat. No. 4,726,182 to Barbier et al. As illustrated therein, such known intake diaphragms typically comprise a stationary member defining a plurality of orifices or openings and a movable member, also defining orifices or openings. When the openings of each of the members are in alignment, the maximum amount of air passes through the openings and into the combustion chamber. When the openings of the movable member are out of alignment with those of the stationary member, no air passes into the combustion chamber. Intermediate positions may be used to control the amount of air entering the combustion chamber, depending upon the operating parameters of the gas turbine engine.

Gas turbine engines, such as those utilized in aircraft, typically have annular combustion chambers with a plurality of intake diaphragms distributed in an annular array to supply oxidizer of air equally around the combustion chamber. It is quite important to control the operation of all of the intake diaphragms simultaneously in order to promote even combustion around the annular combustion chamber.

While many systems are known to control the intake diaphragms, the known systems have either proven unsatisfactory from a control standpoint, or have proven to be unduly complex and, therefore, inherently unreliable.

SUMMARY OF THE INVENTION

A system for controlling oxidizer intake diaphragms for a gas turbine engine combustion chamber is disclosed having a single, linear actuator for each pair of intake diaphragms. The movable member of each of an adjacent pair of intake diaphragms is connected to a movable piston rod of the linear actuator. A cam mechanism urges the piston rod in a first direction so as to simultaneously move the movable members of each of the pair of diaphragms. Pressurized gases from the combustion chamber act on the piston to urge it in a second, opposite direction. The forces of the pressurized gases also maintain contact between the cam member and the piston to insure accurate movement of the movable members.

A plurality of such linear actuators may be disposed around the periphery of the combustion chamber, each actuator controlling a pair of adjacent intake diaphragms. The actuators may be interconnected by a flexible drive shaft to insure uniformity of movement of all of the cam elements in the system. This insures accurate and simultaneous control of all of the intake diaphragms.

Each of the intake diaphragms has a movable collar member, each collar member having a control arm extending therefrom. Adjacent pairs of control members have their control arms attached to an end of a piston rod. The piston rod has a longitudinal axis which bisects the angle between lines connecting the axes of rotation of each of the movable members with the connecting point of the control arms on the piston rod. Movement of the piston rod along its longitudinal axis will simultaneously move each of the movable members of the adjacent intake diaphragms.

Each of the pistons is located within a housing mounted on the combustion chamber wall. The combustion chamber wall defines an opening, through which the piston rod passes, dimensioned to provide a clearance about the piston rod to enable the pressurized gases within the combustion chamber to communicate with the interior of the housing. In order to prevent leakage of these gases from the housing, a flexible bellows member may be incorporated between the piston and a portion of the housing such that the gases communicate only with the interior of the bellows member. The forces on the piston caused by the pressurized gases opposed those imparted to the piston by the actuating cam, thereby insuring continued contact between the cam and the piston. This insures accuracy of the movement of the movable members by preventing any clearance between the cam surface and the piston.

The cam member may be attached to the housing so as to pivot about an axis extending generally radially with respect to the combustion chamber. A cam member may have a gear portion which is drivingly engaged by a worm screw. A plurality of such actuators may be utilized, one for each pair of intake diaphragms disposed about the combustion chamber. Each of the actuators may be connected by a flexible drive shaft such that rotation of one worm screw causes rotation of all of the other worm screws. Thus, a single power source may be connected to the flexible drive shaft to operate all of the intake diaphragms simultaneously.

The system according to the invention is markedly simpler and more compact than the known systems, thereby providing a weight savings as well as reduced manufacturing costs.

DETAILED DESCRIPTION OF THE PREFERRED EMBODIMENT

Figure 1:
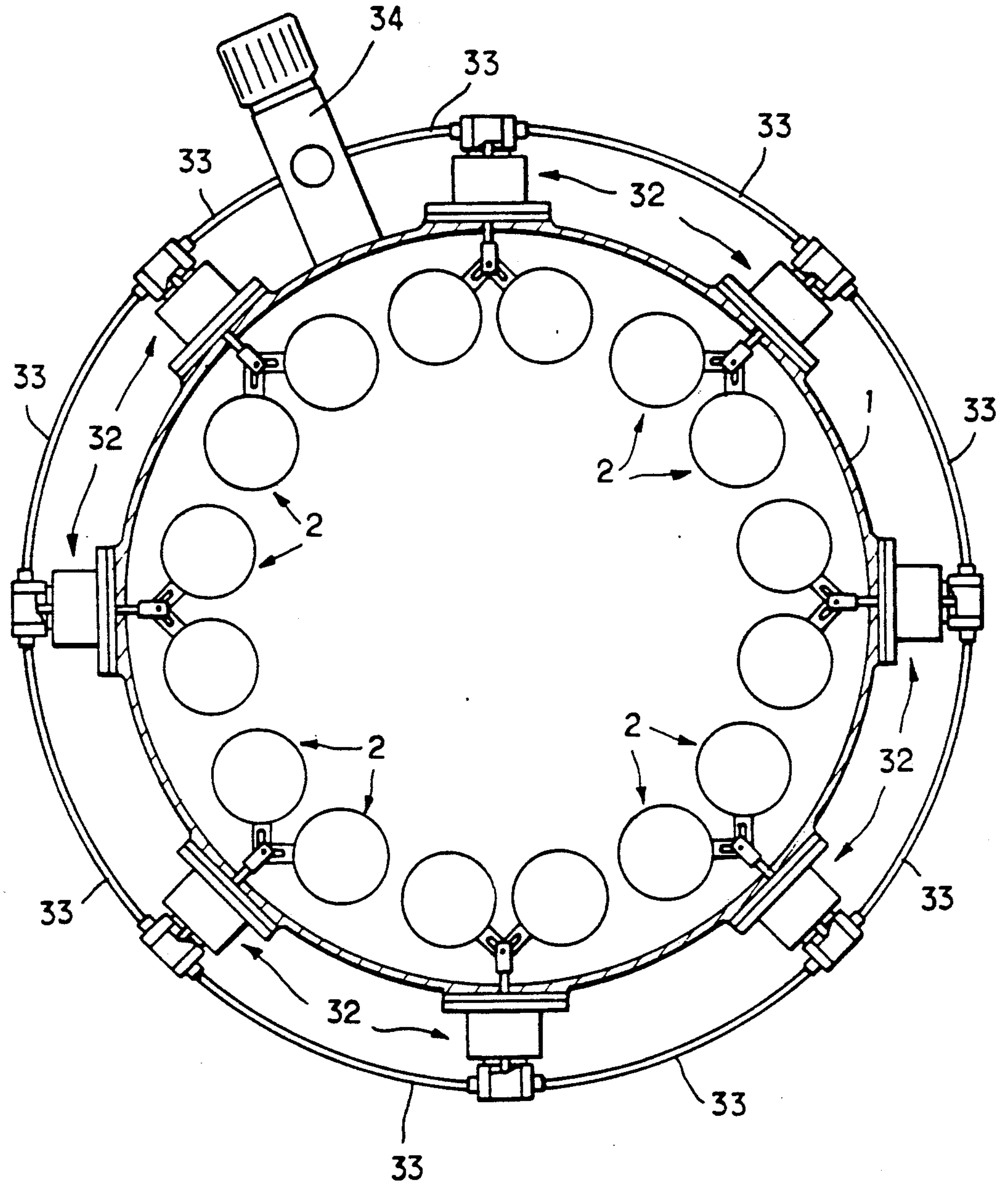
FIG. 1 is a transverse, cross-sectional view of a gas turbine engine equipped with the intake diaphragm control system according to the present invention.

In a gas turbine engine, the annular combustion chamber is defined by an outer combustion chamber wall 1 and has a plurality of intake diaphragms 2 arranged in an annular array. Each of the intake diaphragms 2 comprises a stationary generally cylindrical collar member 3 defining openings 4 therethrough. A movable collar member 6 is disposed about the stationary collar 3 and also defines a plurality of openings 8. The movable collar member 6 rotates about axis 7 such that the openings 8 may be aligned with openings 4, or the movable collar member 6 may be circumferentially displaced such that these openings are out of alignment. In intermediate positions between these two extreme positions, the amount of air passing through the openings 8, the openings 4 and into the combustion chamber 5 may be controlled. The air passes through the intake diaphragms 2 and into the combustion chamber 5 where, in known fashion, it is mixed with fuel and ignited. Although the details of the intake diaphragm 2 is shown for only one such intake diaphragm in FIG. 2, it is to be understood that all of the intake diaphragms 2 have similar constructions.

Figure 4:
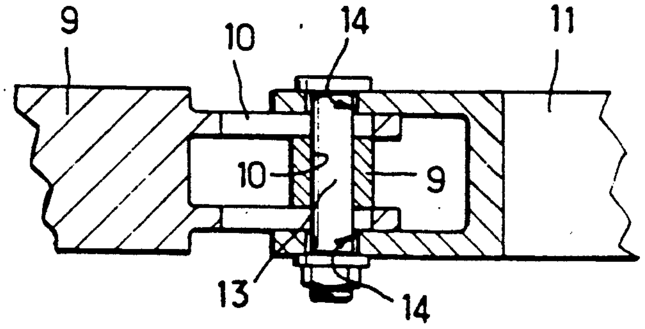
FIG. 4 is a cross-sectional view taken along line IV—IV in FIG. 2.

Each of the movable collar members 6 has a control arm 9 extending generally radially therefrom, which defines an oblong opening 10. The control arms 9 from adjacent pairs of intake diaphragms 2 are both connected to a piston rod 11 which extends from piston 12. As illustrated in FIG. 4, a connecting shaft 13 extends through an opening 14 formed in the end of the piston rod as well as through openings 10 formed in the control arms 9.

Figure 2:
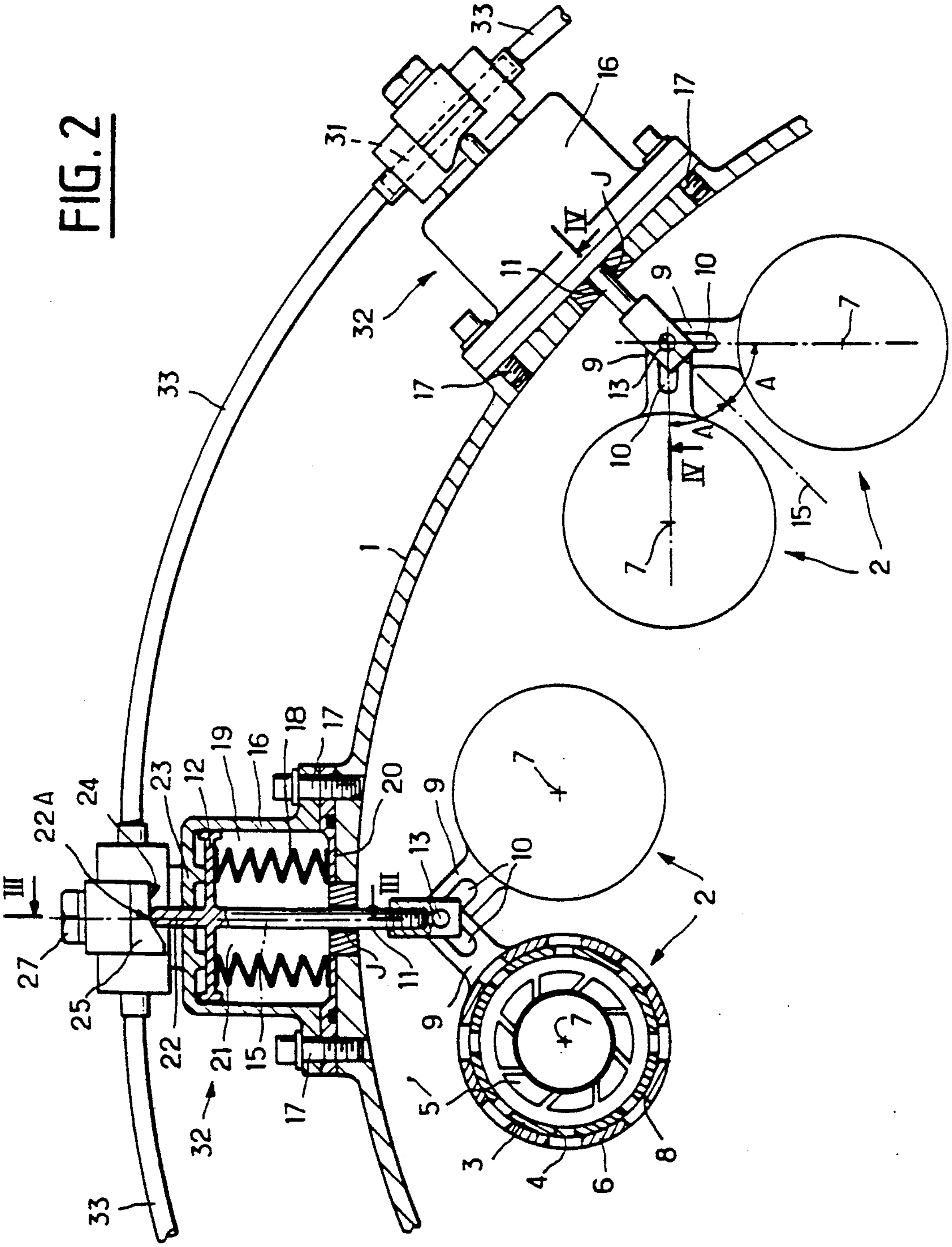
FIG. 2 is a partial, transverse cross-section illustrating the details of the control system according to the present invention.

Lines connecting the rotational axes 7 of the adjacent pairs of intake diaphragms 2 to the pivot axis defined by shaft 13 define an angle 2A therebetween. As illustrated in FIG. 2, the longitudinal axis 15 of the piston rod 11 bisects this angle 2A, such that it forms an angle A with each of the two lines.

Each piston 12 is slidably received in a housing 16, which may be attached to the combustion chamber wall 1 via screws 17 or the like. A flexible bellows member 18 is disposed between one side of the piston 12 and a base 20 of the housing 16. A chamber 19 is defined between the bellows 18 and the housing 16, and the bellows 18 defines a work chamber 21. Work chamber 21 communicates with the combustion chamber 5 through a clearance J defined around the piston rod 11. The clearance J allows the pressurized gases in the interior of the combustion chamber 5 to communicate with the work chamber 21, thereby exerting a force on one side of piston 12. As illustrated in FIG. 2, this force will urge the piston 12 and, consequently the piston rod 11, radially outwardly with respect to the combustion chamber wall 1.

A second piston rod 22 extends from the piston 12 to the exterior of the housing 16, as does the first piston rod 11. The second piston rod 22 may be coaxial with the first piston rod 11 and passes through the top 23 of the housing 16. The second piston rod 22 has a distal end 22A which bears against the cam surface 24 of cam member 25.

Figure 3:
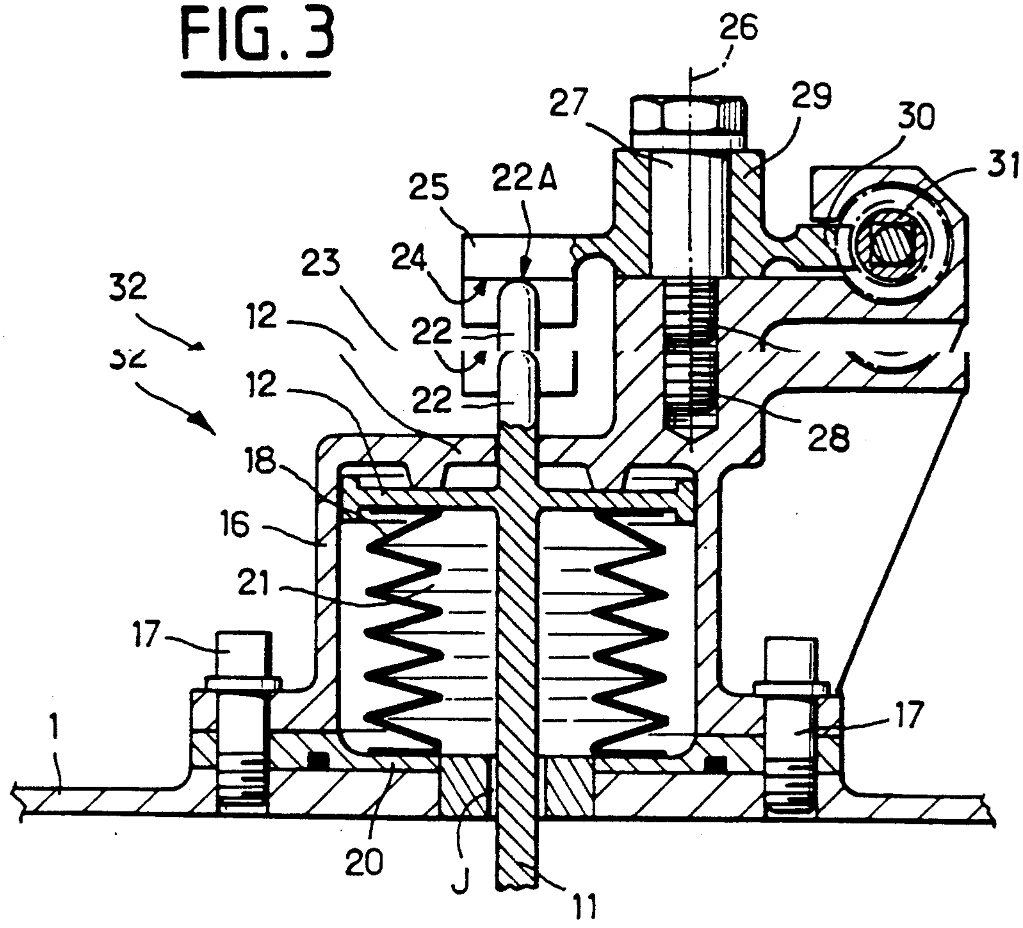
FIG. 3 is a cross-sectional view taken along line III—III in FIG. 2.

As illustrated in FIG. 3, cam member 25 has a support portion 29 which may be attached to the housing 16 via pivot bearing 27 having a threaded portion 28. This attachment allows the cam member 25 to pivot about axis 26 relative to the housing 16.

A gear member 30 may also be formed integrally with the cam member 25 and is located such that it operatively engages a worm screw 31. Worm screw 31 may be mounted in known fashion, such that it rotates within an extended portion of housing 16.

The worm gears 31 of each of the regulators 32 may be interconnected by flexible drive shafts 33. A single drive source 34 may be connected to the flexible drive shafts 33 such that the single drive source 34 drives all of the worm gears 31. This insures that all of the intake diaphragms 2 are operated simultaneously.

As can be readily seen, rotation of the worm gears 31 cause rotation of the cam members 25 about the axis 26. The cam surface 24 then exerts a force on the second piston rod 22 in a first direction (radially inwardly as illustrated in FIG. 2). This causes piston 12 and piston rod 11 to also move radially inwardly against the force on the piston 12 generated by the pressurized combustion gases. Rotation of the worm gear in the opposite direction will move the cam member 25 in an opposite direction about axis 26. The pressurized gases acting on piston 12 will urge it and the piston rods 11 and 22 radially outwardly so as to maintain contact between the distal end 22A of the piston 22 and the cam surface 24.

Thus, in accordance with the present invention, a single drive source will accurately and simultaneously control all of the intake diaphragms of the gas turbine. This design is lightweight and has reduced manufacturing costs in comparison to the known systems.

The foregoing description is provided for illustrative purposes only and should not be construed as in any limiting this invention, the scope of which is defined solely by the appended claims.

I claim:

1. A system for controlling oxidizer intake diaphragms for a gas turbine combustion chamber wherein the gas turbine has at least two intake diaphragms comprising:

a) a first collar member operatively associated with a first intake diaphragm and adapted to move about a first axis;

b) a second collar member operatively associated with a second intake diaphragm and adapted to move about a second axis;

c) a regulator having a single control member; and, d) means for connecting the control member with both the first and second collar members such that operation of the regulator controls movement of the first and second collar members wherein the connecting means comprises:

i) a first control arm extending from the first collar member;

ii) a second control arm extending from the second collar member; and, iii) pivot attachment means pivotally attaching the first and second control arms to the control member;

and wherein the control member has a longitudinal axis and is oriented such that the longitudinal axis bisects an angle between a first line extending between the first axis and the pivot attachment means, and a second line between the second axis and the pivot attachment means.

2. The control system of claim 1 wherein the regulator is a linear actuator.

3. The control system of claim 2 wherein the linear actuator comprises:

a) a housing defining a working chamber;

b) a piston slidably located in the working chamber;

c) a first piston rod attached to the piston, and extending exteriorly of the housing to constitute the control member;

d) first means to exert a force on the piston so as to urge it and the piston rod in a first direction; and, e) second means to exert a force on the piston so as to urge it and the piston rod in a second direction opposite to the first direction.

4. The control system of claim 3 wherein the first means to exert a force on the piston so as to urge it in a first direction comprises:

a) a second piston rod attached to the piston and extending exteriorly of the housing;

b) a cam member having a cam surface operatively associated with the second piston rod such that movement of the cam member urges the second piston rod and the piston in the first direction; and, c) means to move the cam member.

5. The control system of claim 4 wherein the means to move the cam member comprises:

a) a worm screw;

b) means to rotate the worm screw;

c) gear means on the cam member and operatively engaging the worm screw such that rotation of the worm screw moves the cam member.

6. The control system of claim 5 further comprising means to pivotally attach the cam member to the housing.

7. The control system of claim 6 comprising:

a) a plurality of housings, each housing having a cam member moved by a worm screw; and, b) flexible drive shaft means interconnecting the worm screws such that all worm screws rotate together.

8. The control system of claim 3 wherein the housing is attached to a combustion chamber wall of the gas turbine and wherein the second means to exert a force on the piston comprises an opening defined by the combustion chamber wall enabling the working chamber to communicate with the combustion chamber, thereby allowing pressurized gases within the combustion chamber to act on the piston to urge it in the second direction.

9. The control system of claim 8 wherein the first piston rod extends through the opening defined by the combustion chamber wall, the opening defining a clearance around the first piston rod.

10. The control system of claim 9 further comprising a flexible bellows member extending between the piston and the housing, the bellows member located such that the opening defined by the combustion chamber wall allows communication between the combustion chamber and an interior of the bellows member.

11. A system for controlling oxidizer intake diaphragms for a gas turbine combustion chamber wherein the gas turbine has at least two intake diaphragms comprising:

a) a first collar member operatively associated with a first intake diaphragm and adapted to move about a first axis;

b) a second collar member operatively associated with a second intake diaphragm and adapted to move about a second axis;

c) a regulator having a single control member, the regulator comprising a linear actuator wherein the linear actuator comprises:

i) a housing defining a working chamber;

ii) a piston slidably located in the working chamber;

iii) a first piston rod attached to the piston, and extending exteriorly of the housing to constitute the control member;

iv) first means to exert a force on the piston so as to urge it and the piston rod in a first direction, wherein the first means comprises:

a) a second piston rod attached to the piston and extending exteriorly of the housing;

b) a cam member having a cam surface operatively associated with the second piston rod such that movement of the cam member urges the second piston rod and the piston in the first direction; and, c) means to move the cam member;

v) second means to exert a force on the piston so as to urge it and the piston rod in a second direction opposite to the first direction; and d) means for connecting the control member with both the first and second collar members such that operation of the regulator controls movement of the first and second collar members.

12. The control system of claim 11 wherein the connecting means comprises:

a) a first control arm extending from the first collar member;

b) a second control arm extending from the second collar member; and, c) pivot attachment means pivotally attaching the first and second control arms to the control member.

13. The control system of claim 11 wherein the means to move the cam member comprises:

a) a worm screw; and, b) means to rotate the worm screw;

c) gear means on the cam member and operatively engaging the worm screw such that rotation of the worm screw moves the cam member.

14. The control system of claim 13 further comprising means to pivotally attach the cam member to the housing.

15. The control system of claim 14 comprising:

a) a plurality of housings, each housing having a cam member moved by a worm screw; and, b) flexible drive shaft means interconnecting the worm screws such that all worm screws rotate together.

16. The control system of claim 11 wherein the housing is attached to a combustion chamber wall of the gas turbine and wherein the second means to exert a force on the piston comprises an opening defined by the combustion chamber wall enabling the working chamber to communicate with the combustion chamber, thereby allowing pressurized gases within the combustion chamber to act on the piston to urge it in the second direction.

17. The control system of claim 16 wherein the first piston rod extends through the opening defined by the combustion chamber wall, the opening defining a clearance around the first piston rod.

18. The control system of claim 17 further comprising a flexible bellows member extending between the piston and the housing, the bellows member located such that the opening defined by the combustion chamber wall allows communication between the combustion chamber and an interior of the bellows member.

* * * * *